(12) United States Patent
Terada et al.

(10) Patent No.: US 8,080,931 B2
(45) Date of Patent: Dec. 20, 2011

(54) CONDUCTIVE FILM, ELECTRON EMITTING DEVICE AND IMAGE DISPLAY APPARATUS

(75) Inventors: Masahiro Terada, Hadano (JP); Makoto Kojima, Atsugi (JP); Takashi Iwaki, Machida (JP); Takeru Mizue, Atsugi (JP); Tsuyoshi Ibe, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 12/183,614

(22) Filed: Jul. 31, 2008

(65) Prior Publication Data

US 2009/0033223 A1 Feb. 5, 2009

(30) Foreign Application Priority Data

Jul. 31, 2007 (JP) .................................. 2007-198839

(51) Int. Cl.
*H01J 1/00* (2006.01)
(52) U.S. Cl. ........................................ 313/495; 313/311
(58) Field of Classification Search .................. 313/311, 313/495
See application file for complete search history.

(56) References Cited

U.S. PATENT DOCUMENTS

| | | | | |
|---|---|---|---|---|
| 3,990,038 A * | 11/1976 | Jensen et al. | ..................... | 315/17 |
| 4,182,551 A * | 1/1980 | Washida et al. | ................ | 359/274 |
| 6,383,047 B1 | 5/2002 | Minami et al. | ..................... | 445/6 |
| 6,492,769 B1 | 12/2002 | Oda et al. | ........................ | 313/495 |
| 6,586,155 B2 | 7/2003 | Furuse et al. | ............. | 430/270.1 |
| 6,693,375 B1 | 2/2004 | Maruyama | | |
| 6,781,667 B2 | 8/2004 | Horiguchi et al. | ............. | 349/187 |
| 6,783,414 B2 | 8/2004 | Minami et al. | ..................... | 445/6 |
| 6,827,619 B2 | 12/2004 | Oda et al. | .......................... | 445/6 |
| 6,833,224 B2 | 12/2004 | Furuse et al. | ................... | 430/16 |
| 6,896,571 B2 | 5/2005 | Mizuno et al. | ................... | 445/24 |
| 6,910,935 B2 | 6/2005 | Arai et al. | ........................ | 445/24 |
| 6,988,922 B2 | 1/2006 | Iwaki | ............... | 445/6 |
| 6,992,434 B2 | 1/2006 | Terada et al. | ................... | 313/495 |
| 7,074,380 B2 | 7/2006 | Iwaki et al. | ................. | 423/447.3 |
| 7,077,716 B2 | 7/2006 | Mizuno et al. | ................... | 445/24 |
| 7,314,768 B2 | 1/2008 | Furuse et al. | .................... | 438/21 |
| 7,335,081 B2 | 2/2008 | Iwaki et al. | ........................ | 445/6 |
| 2005/0008955 A1 | 1/2005 | Furuse et al. | ................... | 430/12 |
| 2005/0287689 A1 | 12/2005 | Iwaki et al. | ................... | 438/22 |
| 2006/0045961 A1 | 3/2006 | Furuse et al. | ................... | 427/77 |

(Continued)

FOREIGN PATENT DOCUMENTS

JP 8-171850 7/1996

(Continued)

OTHER PUBLICATIONS

English translation of Yamanobe, JP 11-040042, published Feb. 12, 1999.*

(Continued)

*Primary Examiner* — Nimeshkumar Patel
*Assistant Examiner* — Mary Ellen Bowman
(74) *Attorney, Agent, or Firm* — Fitzpatrick, Cella, Harper & Scinto

(57) ABSTRACT

A conductive film of thickness of from 3 nm to 50 nm made from a metal or ally formed on a substrate, wherein the ratio of density thereof to bulk density of the metal or alloy is from 0.2 to 0.5, and the ratio of resistivity thereof to bulk resistivity of the metal or alloy is from 100 to 100000.

3 Claims, 6 Drawing Sheets

U.S. PATENT DOCUMENTS

| | | |
|---|---|---|
| 2006/0057279 A1 | 3/2006 | Terada et al. ................... 427/77 |
| 2006/0170329 A1* | 8/2006 | Tojo et al. ..................... 313/495 |
| 2006/0228478 A1 | 10/2006 | Iwaki et al. ................ 427/249.1 |

FOREIGN PATENT DOCUMENTS

| | | |
|---|---|---|
| JP | 11-040042 A | 2/1999 |
| JP | 2000-243232 A | 9/2000 |

OTHER PUBLICATIONS

English translation of Shibata, JP 2000-243232, published Sep. 8, 2000.*

European Search Report dated Feb. 25, 2010.

* cited by examiner

CONDUCTIVE FILM, ELECTRON EMITTING DEVICE AND IMAGE DISPLAY APPARATUS

BACKGROUND OF THE INVENTION

1. Field of the Invention

The present invention relates to conductive films, electron emitting devices and image display apparatus that uses the conductive films.

2. Description of the Related Art

Conventionally, a general method for manufacturing surface conduction electron emitting devices involves subjecting a conductive film to an electrical current supply process called electrical current supply forming so that the electron emitting part is formed in the conductive film.

The applicant of the present invention proposes a method for forming a conductive film having an advantageous effect over a large area in the method for manufacturing surface conduction electron emitting devices. An example of such a method includes applying an organic-metal-containing liquid to the surface of a substrate by a spinner, forming a pattern of desired shape on the substrate, and decomposing the organic metal under heat, thereby obtaining a conductive film. In addition, Japanese Patent Application Laid-Open No. 8-171850 proposed a method for forming a conductive film of a desired shape by applying droplets of an organic-metal-containing liquid to the surface of the substrate by means of an inkjet.

The conductive film formed by the foregoing method is a film formed from fine particles of metal or metal oxide or a film in which fine particles are densely continuous.

By controlling the compositional materials and film thickness of the conductive film, the resistance of the conductive film is controlled so as to fall within a preferred range for an electron emitting device. From the point of view of electrical current supply forming and electron emission efficiency, it is necessary the range be from several nm to several tens nm.

Even if the film is thin, variation in the resistance of the conductive film must be restrained in order to stabilize electron emitting characteristics and restrain any variation in them. In addition, the conductive film must have sheet resistance as high as from 10 K to several hundred KΩ/□.

However, where the conductive film formed by the foregoing method is composed of metal as its main component and has a thickness of several nm or less, its resistance varies considerably and such a conductive film is not, therefore, suitable for practical use. Even if the film has a thickness of several nm or more and is stably resistant, its sheet resistance will be as low as several KΩ/□. Likewise, where the film is composed of a metal oxide as its main component and has a thickness of several nm or less, resistance varies considerable, and, therefore, the film is not suitable for practical use. Even if the film has a thickness of several nm or more and is stably resistant, the resistance will be significantly affected by whether moisture or the like adheres to the surface of the film. Even if the film is baked in a vacuum for stabilization, part of the film will be deoxidized, which makes it impossible to stably obtain a conductive film of sheet resistance as high as from 10 K to several hundred KΩ/□. Accordingly, electron sources in which more than one electron emitting devices are disposed suffer from the problem of large variation in electron emitting characteristics.

Even in an image display apparatus in which the electron source and a fluorescent substance are disposed opposite each other, variation in electron emitting characteristics leads to such problems as degradation in image quality.

SUMMARY OF THE INVENTION

The present invention has been proposed in view of the problems discussed above and it is accordingly an object of the present invention to provide a conductive film that has thickness of from several nm to several tens nm, high resistance of from 10 K to several hundred KΩ/□, and low variation in resistance.

Another object of the present invention is to provide: a high-quality electron emitting device that uses a conductive film high in resistance but low in resistance variability; an electron source in which a plurality of electron emitting devices with consistent quality are disposed; and an image display apparatus using such electron source.

DESCRIPTION OF THE EMBODIMENTS

Figure 1A:
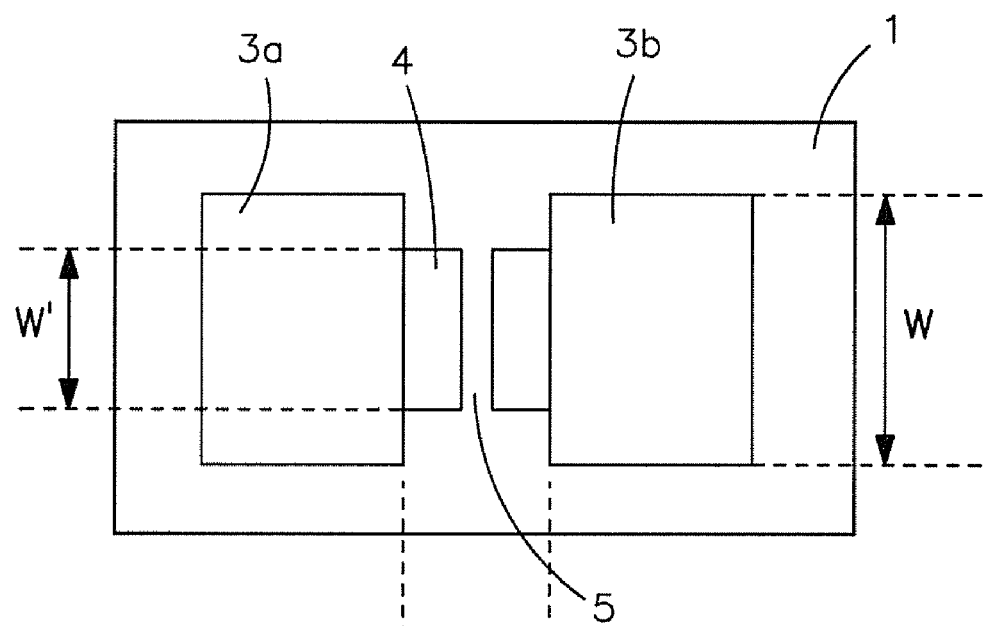
FIG. 1A is a plan view schematically showing an example of an electron emitting device that has a conductive film according to the present invention.

According to a first aspect of the present invention, there is provided a conductive film of thickness of from 3 nm to 50 nm formed from a metal or alloy on a substrate, wherein the ratio of density thereof to density of the metal or alloy bulk is from 0.2 to 0.5, and the ratio of resistivity thereof to resistivity of the metal or alloy bulk is from 100 to 100000.

According to a second aspect of the present invention, there is provided a conductive film of thickness of from 3 nm to 50 nm formed from a metal or alloy on a substrate, wherein the film of the metal or alloy has a structure that is anisotropic, such that particles are more continuous along the thickness of the film than along the plane of the film.

According to a third aspect of the present invention, there is provided a conductive film of thickness of from 3 nm to 50 nm formed from an alloy on a substrate, wherein the film of the alloy is formed from at least two or more elements selected from transition metal group A (Ni and Co) and precious metal group B (Pd, Pt, Ir, and Rh) and the element ratio of the group A materials to the group B materials in the alloy is 2 or more.

According to another aspect of the present invention, there is provided an electron emitting device that has a conductive film according to any one of the first to the third aspects of the present invention, and to provide an image display apparatus that has the electron emitting device.

As described above, examples of the method for forming a conductive film include: the sputtering method, an evaporation method, and the method in which an organic-metal-containing liquid is applied to the surface of a substrate by a spinner, a pattern of desired shape is formed on the substrate, and the organic metal is decomposed under heat to obtain a conductive film. Another example is a method in which droplets of an organic-metal-containing liquid are applied to the surface of the substrate by an inkjet method, and a conductive film of a desired shape is thereby formed. The conductive films formed by any method are required to be from several nm to several tens nm thick from the point of view of the electrical current supply forming and electron emission efficiency discussed above.

In order to stabilize the electron emitting characteristics and restrain variation in these characteristics, the conductive film is required to have a sheet resistance as high as from 10 K to several hundred KΩ/□ . and low resistance variability.

Normally, the volume resistivity of bulk metal is approximately $10^{-7}$ Ωm, and the simply calculated sheet resistance of a film of a thickness of from 3 nm to 50 nm is from 2 to 30Ω/□ .

It is well known that a metal film formed by a conventional method, such as a sputtered film, evaporated film, or a film formed by spinner application and baking, increases in sheet resistance several times to several tens of times on account of the thin film effect. That is, the film actually obtained has resistance of only several tens to several KΩ/□ . In addition, a film that has a resistance as high as 1 KΩ/□ . or greater is as extremely thin as several nm or so. This leads to wide variation in resistance when many films are formed.

As a result of earnest research, the inventors of the present invention have found that a specific film structure makes it possible to acquire an intended conductive film that has less resistance variability (i.e., 30% or less in 3σ/average value). Specifically, a satisfactory result is acquired where the ratio of the film density to bulk density is from 0.2 to 0.5 and the ratio of its resistivity to that of the metal or alloy bulk is from 100 to 100000.

In this case, films with high resistance of from several KΩ/□ .to several hundred KΩ/□ .can be manufactured stably with less variation, even they have volume resistivity of approximately $10^{-7}$ Ωm and thickness of from 3 nm to 50 nm.

Generally, resistance increases as film density decreases. If the ratio of film density to bulk density becomes 0.5 or below, resistance and variation will be large and uncontrollable in most situations.

The film according to the present invention is formed from an alloy of two or more elements selected from transition metal group A (Ni, Co) and precious metal group B (Pd, Pt, Ir, and Rh) The composition range of such an alloy is such that the A group material is two or more times greater than the B group material in element proportion. As a result of observing a sectional TEM image and a planar TEM image, the inventors have confirmed that the metal or alloy film has an anisotropic film structure, in which the particles are more continuous along the thickness of the film than along the plane of the film. The selection of the special material is supposed as the cause of it.

It is supposed that these factors lead a satisfactory result in which less variation according to film thickness is achieved even if the ratio of the film density to bulk density is from 0.2 to 0.5 and the ratio of film resistivity to the metal or alloy bulk resistivity is from 100 to 100000. These factors are also supposed to prevent an excessive resistance increase.

To be more specific, a liquid containing metal complexes of the transition metal group A and the precious metal group B is applied to the surface of the substrate by a spin coat or inkjet method. Then, the substrate is heated and baked in atmospheric air heated to a level not less than the temperature (e.g., 350° C.) at which the metal complexes decompose, thereby forming a film of oxide of a metal mixture or a film of a mixture of metal and metal oxide. It is confirmed by X-ray diffraction measurement that an oxide of a mixture of Ni and Pd (for example) exhibits no diffraction peak and Ni and Pd are completely mixed and rendered amorphous.

The film of the oxide of the mixture is baked in a vacuum at 300° C. for several hours, and thereby deoxidized. Thus, a film of metal or alloy is obtained. The conditions of the film have been found from the results of XPS analysis and X-ray diffraction.

Generally, the formation of an alloy requires complete melting of component metals. The fusing points of the Pd and Ni are 1550° C. and 1450° C. respectively and they are required to be heated to as high as one thousand and several hundred ° C. in bulk. It is well known that reducing the metal materials to fine particles can decrease its fusing points. However, this has not been exploited successfully yet in forming Ni—Pd alloy at temperature as low as 500° C. or below.

Such low melting point is thought to be achieved because, in the deoxidization process by vacuum bake of the metal oxide, the metal oxide rendered amorphous so completely that the elements are located adjacent to one another. Also, it has been assumed that a film of low density may be a factor in the formation of a highly resistant, less variable stable film according to the invention.

The inventors have found that a conductive film satisfying the first and second condition below makes it possible to stably restrain variation in the film from several KΩ/□ . to several hundred Ω/□ . even with a film thickness of 3 nm to 50 nm. The first condition is that the film is formed from an alloy of at least two or more elements selected from the transition metal group A (Ni, Co) and precious metal group B (Pd, Pt, Ir, and Rh). The second condition is that the composition range of the alloy is such that the A group material is two or more times higher than the B group material in element proportion and that the conductive film contains 30% or more graphite carbon in element proportion.

Unlike the film described previously, this film contains 30% or more graphite carbon in element proportion. This is achieved by storing adherable carbon (i.e., amorphous) on the surface of the metal oxide or by controlling the atmosphere in a vacuum baker by means of a carbon or carbonic gas component.

In order that amorphous carbon or carbonic gas component be formed into graphite carbon, a metal component is required to perform a catalytic action. The conductive film according to the present invention is formed from an alloy of at least two or more elements selected from the transition metal group A (Ni, Co) and precious metal group B (Pd, Pt, Ir, and Rh) A sufficient catalytic action is caused by the film in which the composition range of the alloy is such that the A group material is two or more times greater than the B group material in element proportion. The film formation methods described above or the like make it possible to form a film containing 30% or more graphite carbon in element proportion. The element composition ratio of the film is analyzed using EPMA (Electron Probe Micro Analysis) and XPS (X-ray Photoelectron Spectroscopy) and the graphite property of the carbon in the film is analyzed by Raman spectroscopy.

Referring to the accompanying drawings, preferred embodiments according to the present invention will hereinafter be illustratively described in detail. It should be understood that the scope of the invention not be limited to the disclosed exemplary embodiments by any of the details of the description of the dimensions, materials, shapes, relative dispositions of the components or the like, unless otherwise specified.

Figure 1B:
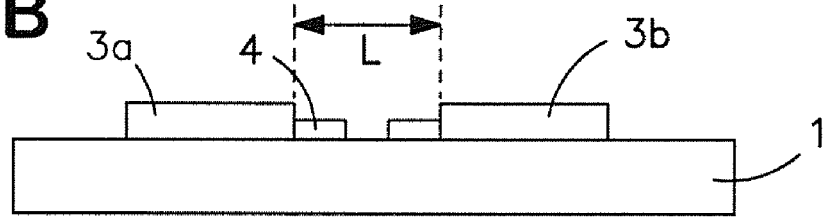
FIG. 1B is a sectional view of the device.

FIGS. 1A and B schematically show an example of one configuration of an electron emitting device according to the present invention, and are a plan view and a sectional view respectively. In FIGS. 1A and 1B, reference numeral 1 represents a substrate; reference numerals 3a and 3b represent electrodes; reference numeral 4 represents a conductive film; reference numeral 5 represents a gap. This electron emitting device emits electrons from the conductive film 4 with a voltage applied between the electrodes 3a and 3b.

Examples of the substrates 1 includes: quartz glass; glass in which the contained amount of impurity such as Na is decreased; blue plate glass; glass substrate with $SiO_2$ formed on its surface; or ceramics substrate such as alumina. If necessity requires, the surface of the substrate may be rendered hydrophobic by using a silane coupling agent after being sufficiently cleaned.

Examples of the material for the electrodes 3a and 3b are metals such as Pd, Pt, Ru, Ag, Au, Ti, In, Cu, Cr, Fe, Zn, Sn, Ta, W, and Pb.

An gap L between the electrodes 3a and 3b is preferably several hundred Å to several hundred μm. It is preferable that the voltage applied between the electrodes 3a and 3b be lower. For more precise reproducibility, the preferable gap L is several hundred Å to several μm.

The conductive film 4 is formed in the manner described below. The conductive film is formed on the substrate by a general coating method such as a rotary coating method or a dip method or by a method using a droplet application device. The method using a droplet application device will now be described.

Any droplet application device suffices as long as it forms the required droplets. It is preferable to use a device from an inkjet system that is capable of controlling droplet formation in the range from ten and several ng (nanogram) to several tens ng and capable of easily forming droplets in a very small quantity in the range from ten and several ng to several tens ng.

The materials composing the conductive film 4 are, for example, carbon, a precious metal such as Pd, Pt, Rh, or Ir, and a transition metal such as Ni or Co.

Examples of a liquid formed into droplets 24 are a liquid prepared by dissolving the above-mentioned materials to compose the conductive film 4 in water, solvent, etc., or a liquid containing an organometallic compound.

Examples of the above-mentioned liquids are materials capable of forming a conductive film by exposure to heating and baking. Such materials include soluble metal compounds, for example metal salts such as a halogen compound, nitrate compound, or nitrous compound of metal, and metal complex such as an ammine complex or organic amine complex. In particular, an organic metal compound is suitable because it can easily be baked. An example of a suitable organic metal compound is an organic acid salt of metal. Such an organic acid is, for example, any carboxyl-group including acid such as formic acid, acetic acid, propionic acid, butyric acid, isobutyric acid, oxalic acid, malonic acid, succinic acid, or amino acid. In particular, acetic acid, propionic acid, and amino acid are suitable for use. In order to improve solubility in water in particular, a metal complex containing a ligand such as ethanolamine is also used.

In the present invention, the conductive film is formed at a predetermined ratio of precious metal (e.g., Pd, Pt, Rh, or Ir) to transition metal (e.g., Ni or Co). When a liquid for droplets used in the droplet application device is prepared, the quantity of precious metal and the quantity of transition metal complex are adjusted so that the conductive film to be formed has the required precious metal/metal complex ratio. The quantities of metals in the conductive film can be adjusted by the metal concentration of liquid prepared or the number of times that droplets are applied by the droplet application device.

The process of baking droplets applied by the liquid droplet application device may use any ordinary heating means. Generally, droplets are baked in the atmosphere at temperatures in the range of 250° C. to 500° C., preferably at 350° C. After baking at 350° C., the droplets are further baked at 300° C. in a vacuum at $1 \times 10^{-6}$ Pa or below within the chamber.

Subsequently, the conductive film thus formed is subject to electrical current supply forming in order to form an electron emitting part in the conductive film.

A power source (not shown) supplies electrical current between the electrodes 3a and 3b at the predetermined degree of vacuum, thereby forming a gap (e.g., crack) and hence an electron emitting part in the formed conductive film.

Figure 2A:
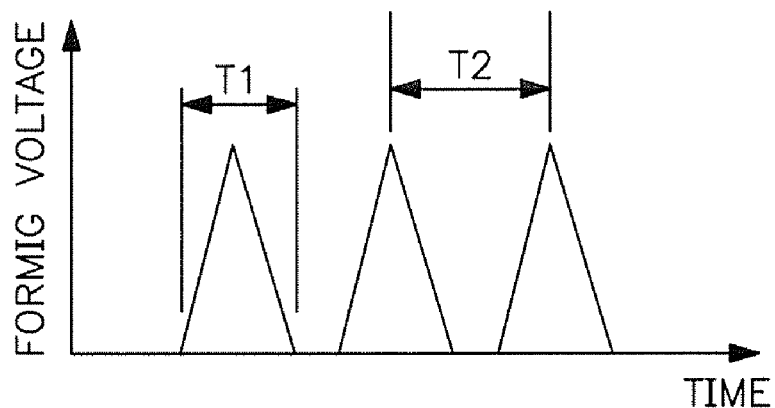
FIG. 2A is a diagram showing an example of a forming voltage.
Figure 2B:
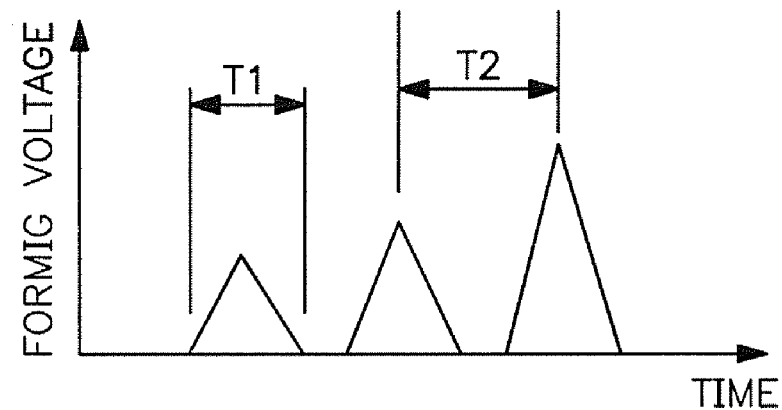
FIG. 2B is a diagram showing another example of the forming voltage.

Referring to FIG. 2, there are shown examples of the voltage waveform required for electrical current supply forming. In particular, it is preferable that the voltage waveform be a pulse waveform. A pulse waveform is obtained by a method in which the pulses of a constant voltage of a high pulse amplitude are continuously applied as shown in FIG. 2A or by a method in which pulses are applied increasing the pulse amplitude as shown in FIG. 2B.

First, the case where a constant voltage of high pulse amplitude is applied will be described with reference to FIG. 2A. T1 and T2 in FIG. 2A represent the pulse width and pulse interval, respectively, of a voltage waveform. Generally, T1 is set at 1 μsec to 10 msec, and T2 is set at 10 μsec to 100 msec. The amplitude of a triangular wave (i.e., a peak voltage in an electrical current supply forming period) is appropriately selected according to the form of the electron emitting device. Under such conditions, a voltage is applied from several sec to several tens min. The pulse waveform is not limited to a triangular wave but may be any desired waveform such as a rectangular wave.

Next, the case where voltage pulses are applied increasing pulse wave amplitude will be described with reference to FIG. 2B. T1 and T2 in FIG. 2B are identical to those in FIG. 2A. The amplitude of a triangular wave (i.e., the peak voltage in an electrical current supply forming period) can be increased about 0.1 V each time.

Electrical current supply forming can be terminated when the resistance obtained by measuring the current flowing in the device during the application of pulse voltage has become, for example, equal to or higher than 1 MΩ.

Subsequently, it is desirable to activate the above-mentioned device in order to enhance electron emission efficiency.

This activating process can be performed by repeatedly applying a pulse voltage between the electrodes 3a and 3b at an appropriate degree of vacuum in the presence of an organic compound gas. A carbon or carbon compound derived from an organic compound gas can be deposited in the form of a carbon film near the gap (crack).

In this process, for example, tolunitrile can be used as the organic compound. The tolunitrile is introduced into a vacuum space through a slow leak valve and the pressure inside is kept at about $1.3 \times 10^{-4}$ Pa. The preferable pressure of the tolunitrile to be introduced falls roughly in the range from $1 \times 10^{-5}$ Pa to $1 \times 10^{-2}$ Pa, while it is slightly affected by the shape of the vacuum device, the members composing the vacuum device or the like.

Referring to FIG. 3, there is shown a preferred example of a voltage applied during the activating process. The maximum voltage applied is appropriately selected within the range from 10 to 20 V.

Figure 3A:
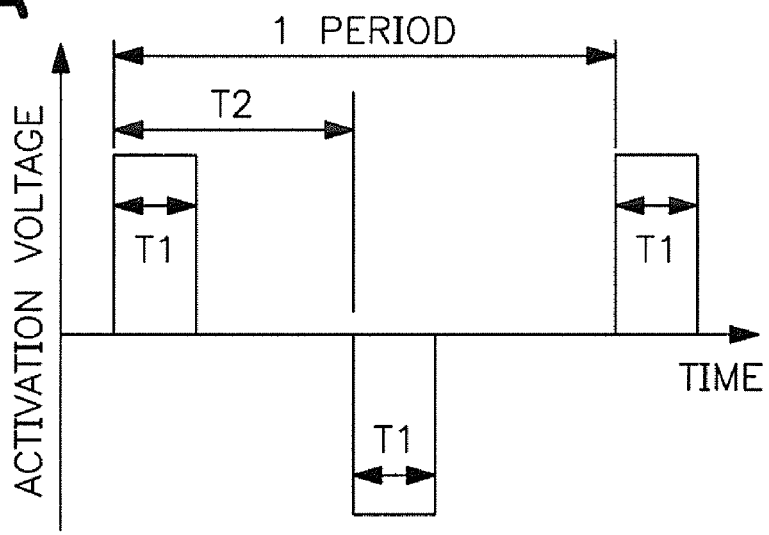
FIG. 3A is a diagram showing an example of an activating voltage.
Figure 3B:
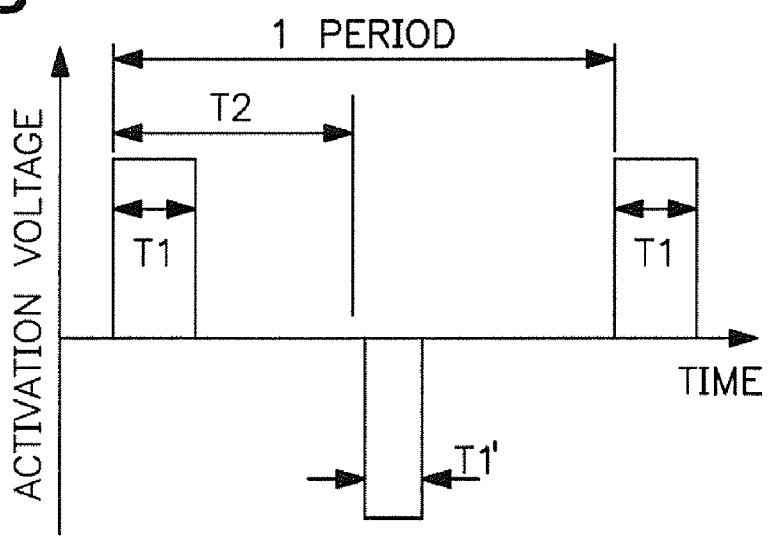
FIG. 3B is a diagram showing another example of the activating voltage.

In FIG. 3A, T1 represents the pulse width of positive or negative pulse in a voltage waveform, and T2 represents a pulse interval. The absolute values of the positive and negative voltage are equal. In FIG. 3B, T1 and T1' respectively represent the pulse width of the positive pulse and negative pulse in voltage waveform. T2 represents a pulse interval. Here, T1 is set to be larger than T1' (T1>T1'). The absolute values of the positive and negative voltage are equal.

The supply of electrical current is stopped after about 60 minutes, just as emission current Ie has almost saturated. Then, the slow leak valve is closed and the activating process is terminated.

Thus, an electron emitting device as shown in FIG. 1 can be formed by the foregoing process.

Next will be described an electron source and image display apparatus according to the present invention.

Figure 4:
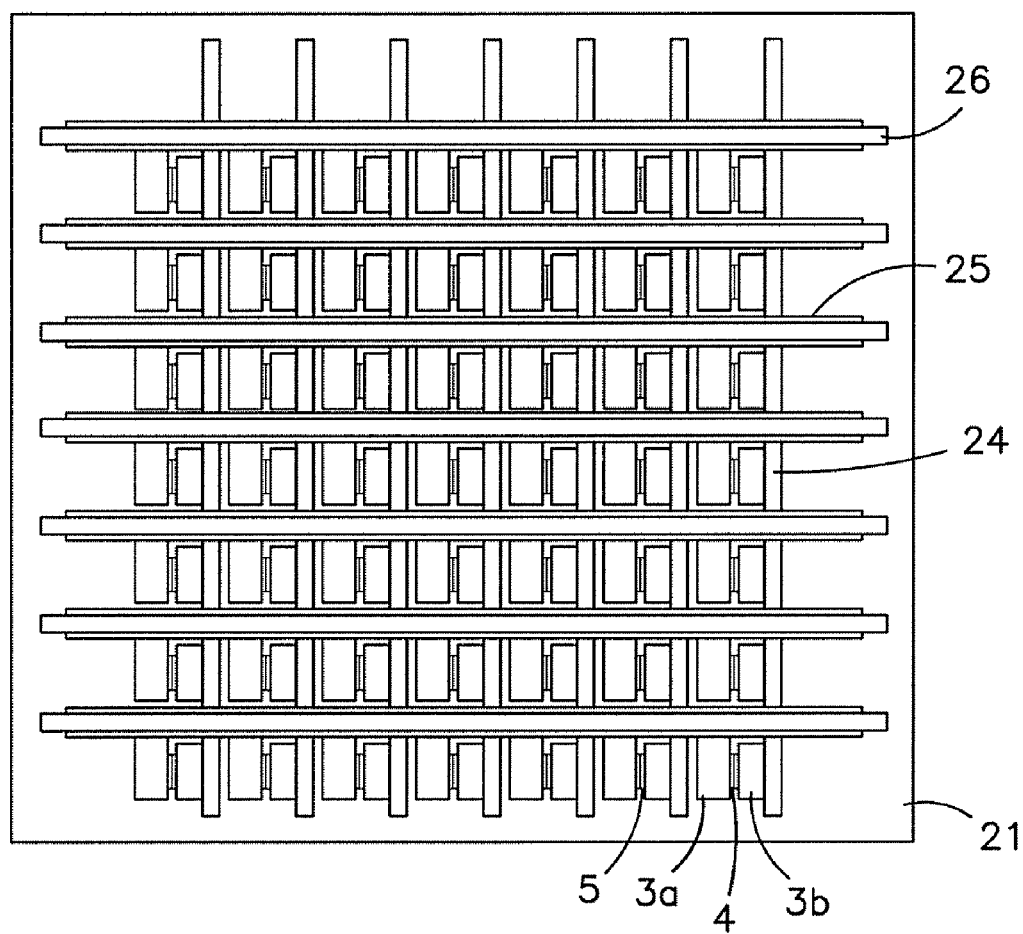
FIG. 4 is a plan view schematically showing an electron source formed from electron emitting devices, shown in FIG. 1, wired together in a matrix.

FIG. 4 is a schematic view showing an embodiment of the electron source of the present invention, in which reference numeral 21 represents a substrate, reference numeral 24 represents Y-direction wirings (i.e., lower wirings), and reference numeral 26 represents X-direction wirings (i.e., upper wirings). As described above, reference numerals 3a and 3b represent electrodes; reference numeral 4 represents a conductive film; and reference numeral 5 represents a gap.

The electron source according to the present embodiment is formed by wiring a plurality of electron emitting devices together in a matrix on the substrate 21. The configuration of each of the electron emitting devices is identical to that in FIG. 1.

An example of an image display apparatus using an electron source with such a simple matrix arrangement will hereinafter be described with reference to FIG. 5.

Figure 5:
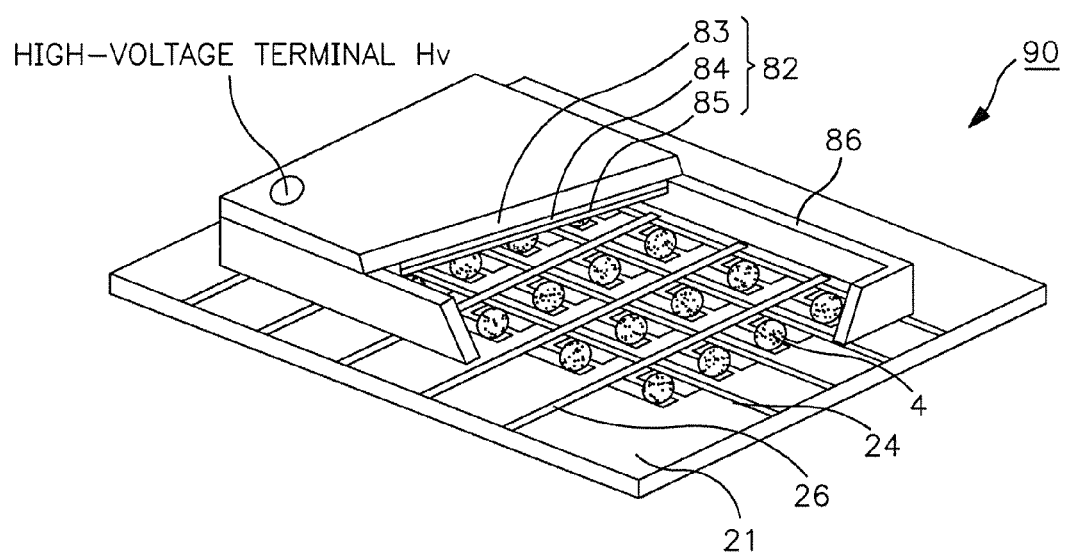
FIG. 5 is a perspective view schematically showing an example of a configuration of an image forming apparatus.

In FIG. 5, reference numeral 21 represents the substrate described above; reference numeral 82 represents a face plate formed from a translucent substrate 83 (e.g., glass), a florescent film 84 and a metal back 85 that are formed on the internal face of the substrate 83; and reference numeral 86 represents a support frame. An outer container 90 is obtained by means of jointing the substrate 21, support frame 86, and face plate 82 together by frit glass, and sealing them by baking at 400 to 500° C. for 10 or more minutes.

In the case of a large-area panel, disposing support members (not shown), namely spacers, between the face plate 82 and substrate 21 makes it possible to form the outer container 90 with sufficient strength relative to the atmosphere.

Figure 6A:
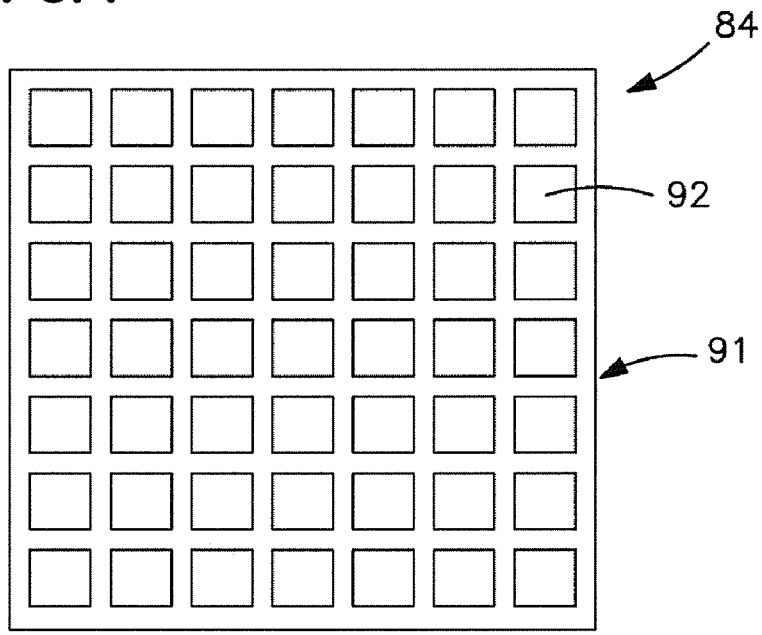
FIG. 6A is a view schematically showing an example of a fluorescent film of the image forming apparatus.
Figure 6B:
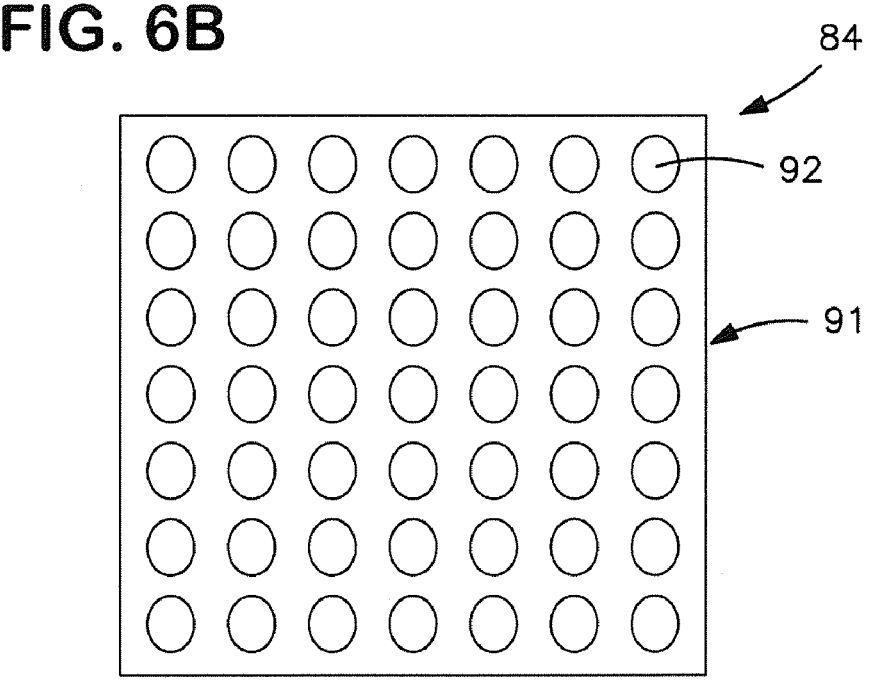
FIG. 6B is a view schematically showing another example of the fluorescent film of the image forming apparatus.

FIG. 6 is a view explaining the fluorescent film 84 formed on the face plate 82. The fluorescent film 84, if it is monochrome, is consisted only of a fluorescent substance. In case of color fluorescent film, it is formed from a black conductive material 91 and a fluorescent substance 92. The black conductive material may be called black stripe or black matrix depending on its arrangement. The purposes of using the black conductive material 91 are to blacken the boarders between the fluorescent substances 92 of three primary colors required for color display and thus make color mixture inconspicuous, and to restrain any contrast decrease caused by outdoor light reflected in the fluorescent film 84.

The metal back 85 is generally formed on the internal face of the fluorescent film 84. The purposes of the formation of the metal back 85 are, for example, to improve luminance by reflecting specularly the light emitted inward from the fluorescent substance 92 toward the face plate 82, and to cause the metal back 85 to act as an anode used for applying an electron beam acceleration voltage. The metal back 85 can be formed by forming a fluorescent film, subjecting the internal surface of the fluorescent film to a smoothing process (generally called "filming"), and depositing Al by vacuum evaporation or the like.

With a color fluorescent film, the outer container 90 must be sealed such that fluorescent substances of respective colors match the corresponding electron emitting devices. This requires adequate alignment of the upper and lower substrates by a butting method or the like.

The degree of vacuum required for sealing the outer container 90 is about $10^{-5}$ Pa. In order to maintain the degree of vacuum after sealing the outer container 90, a getter process may be performed if necessary. The getter process is a process in which a getter disposed at a predetermined place (not shown in the figure) in the outer container is heated by a heating method such as resistance heating or high frequency heating just before or after the sealing of the outer container 90, thereby forming an evaporated film. The getter is typically constituted from, for example, Ba as a main component, and used to maintain the degree of vacuum by means of the adsorption action of the evaporated film.

In the foregoing image display apparatus according to the present invention, electrons are emitted by applying a voltage to each of the electron emitting devices through the X and Y direction wirings. Simultaneously with this, a high voltage is applied to the metal back 85, which is an anode, from a high voltage terminal Hv connected to a DC voltage source, and the electron beam thus generated is accelerated to collide with the fluorescent film 84. Thus, an image can be displayed.

It should be understood that the foregoing configuration of the image display apparatus is an example of the present invention and is not restrictive and that various modifications may be made based on the technical concepts of the present invention.

EMBODIMENTS

First Embodiment

In this embodiment, electron emitting devices of the type shown in FIG. 1 are formed. FIGS. 1A and 1B are a plan view and a sectional view, respectively, of this device. In the FIGS. 1A and 1B, reference numeral 1 represents an insulating substrate; reference numerals 3a and 3b represent device electrodes for applying a voltage to the device; reference numeral 4 represents a conductive film; and reference numeral 5 represents a gap. Reference letter L represents the gap between the device electrodes 3a and 3b; W represent the width of each of the device electrodes; and W' represents the width of the conductive film.

"PD-200" (tradename, manufactured by Asahi Glass Co., LTD), which has glass thickness of 2.8 mm and contains less alkali is used as the substrate 1, and an $SiO_2$ film of 100 nm is applied and baked as a natrium block layer on this substrate 1.

To form the device electrodes 3a and 3b, a 5-nm film of titanium (Ti) is formed as an undercoating layer on the substrate 1 by a sputtering method, and a 40 nm film of platinum (Pt) is formed on the film of titanium. Subsequently, a photoresist is applied to the film of platinum, and the photoresist is subjected to patterning by a photolithography method including exposure, development and etching conducted in series. Thus, the device electrodes are formed.

In the first embodiment, the gap L between the device electrodes is 10 µm and the width W is 100 µm.

After being sufficiently cleaned, the substrate is placed in a container holding saturated diacetoxydimethylsilane, and left to stand at room temperature (about 25° C.) for 30 minutes. Thereafter, the substrate is taken out from the container and heated at 120° C. for 15 minutes, and the surface of the substrate is treated with a silane coupling agent.

Subsequently, a 100 g aqueous solution is prepared by dissolving, in water, palladium-proline complex (0.105 g), nickel acetate hydrate (0.707 g), 88% saponified polyvinyl alcohol (500 average degree of polymerization) (0.1 g), ethylene glycol (2 g %), and 2-propanol (15 g). The water in which these substances are dissolved is passed through a membrane filter with a pore size of 0.25 µm and a solution of palladium nickel compound (with the mole ratio of Pd metal to Ni metal 10:9) is thus obtained. Then, using an inkjet device with a piezoelectric element, in which dot size has been set to 60 µm, the solution of palladium nickel compound is applied between the device electrodes 3a and 3b of the substrate. Different substrates are also prepared in the same manner but changing the number of times that the solution of palladium nickel compound is applied between the device electrodes 3a and 3b. Each of the substrates is heated in 350° C. atmospheric air in an oven for 30 minutes, thereby forming the Pd and Ni oxides between the device electrodes 3a and 3b on the substrate.

The dot diameters of the Pd and Ni oxides thus obtained are both 60 µm as a result of their being measured by an optical microscope.

These substrates are placed in a vacuum chamber and baked at 300° C. and $1\times10^{-5}$ Pa or below for ten hours. Thereafter, the resistance of the film formed between the device electrodes 3a and 3b on each of the substrates is measured. The results of the measurements of sheet resistance are as follows: the film formed with four droplets of the solution of palladium nickel compound has 12 kΩ/□. that with three droplets 24 kΩ/□. and that with two droplets 86 kΩ/□.

Next, using an X-ray micro-analyzer (EPMA: Electron Probe MicroAnalyzer), each of the films is subjected to quantitative analysis to measure the quantity of Pd and Ni metals. The results of the measurements of metal abundance are as follows: the film formed with four droplets of the solution of palladium nickel compound contains $58.7\times10^{15}$ atoms/cm$^2$; that with three droplets $42.7\times10^{15}$ atoms/cm$^2$; and that with two droplets $29.9\times10^{15}$ atoms/cm$^2$.

Using the foregoing results, the metal abundance and sheet resistance are plotted on the graph with the horizontal axis representing the metal abundance and the vertical axis representing the reciprocal of the sheet resistance. The approximation line (hereinafter referred to as "conductance curve") is thus obtained.

From the conductance curve, the metal abundance corresponding to sheet resistance of 24 kΩ/□. is derived. Then, the degree of fluctuation (ΔR) of the sheet resistance when the metal abundance fluctuates by +10 or −10% is divided by the sheet resistance of 24 kΩ/□. (ΔR/24000). The result for the material at Ni-to-Pd mole ratio of 90:10 is 22.8%.

$$\Delta R = \sqrt{\{\frac{1}{2}(A^2+B^2)\}}$$

A=[the resistance when the metal abundance is increased by 10% compared to that corresponds to 24 kΩ/□.−24000

B=[the resistance when the metal abundance is decreased by 10% compared to that corresponds to 24 kΩ/□.−24000

Second Embodiment

A 100 g aqueous solution is prepared by dissolving, in water, palladium-proline complex (0.057 g), nickel acetate hydrate (0.772 g), 88% saponified polyvinyl alcohol (500 average degree of polymerization) (0.1 g) ethylene glycol (2 g %), and 2-propanol (15 g). The water in which these substances are dissolved is passed through a membrane filter with a pore size of 0.25 µm, and a solution of palladium nickel compound (with mole ratio of Pd metal to Ni metal 5:95) is thus obtained. Different substrates are prepared in the same manner as in the first embodiment, except that the solution of palladium nickel compound (prepared as above) is applied by the inkjet device, changing the number of times that this solution is applied between the device electrodes 3a and 3b. Each of the substrates is baked at 350° C., then further baked at 300° C. in a vacuum chamber for ten hours and the resistance of each of the formed films is measured. The results of the measurements are as follows: the film formed with two droplets of the solution of palladium nickel compound has 75 kΩ/□. that with three droplets 24 kΩ/□. and that with four droplets 13.6 kΩ/□. The metal abundance formed in each of the films is measured using EPMA. The results of the measurements are as follows: the film with two droplets of the solution of palladium nickel compound contains $28.6\times10^{15}$ atoms/cm$^2$; that with three droplets $43.8\times10^{15}$ atoms/cm$^2$; and that with four droplets $59.4\times10^{15}$ atoms/cm$^2$.

From the conductance curve, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The result for the material at Ni-to-Pd mole ratio of 95:5 is 11.9%.

Third Embodiment

A 100 g aqueous solution is prepared by dissolving, in water, palladium-proline complex (0.915 g), nickel acetate hydrate (0.585 g), 88% saponified polyvinyl alcohol (500 average degree of polymerization) (0.1 g), ethylene glycol (2 g %), and 2-propanol (15 g). The water in which these substances are dissolved is passed through a membrane filter with a pore size of 0.25 µm, and a solution of palladium nickel compound (with mole ratio of Pd metal to Ni metal 20:80) is thus obtained. Different substrates are prepared in the same manner as in the first embodiment, except that the solution of palladium nickel compound (prepared as above) is applied by the inkjet device, changing the number of times that this solution is applied between the device electrodes 3a and 3b. Each of the substrates is baked at 350° C., then further baked at 300° C. in a vacuum chamber for ten hours and the resistance of each of the films formed film is measured. The results of the measurements are as follows: the film formed with two droplets of the solution of palladium nickel compound has 73.6 kΩ/□. that with three droplets 22.4 kΩ/□. and that with four droplets 12.8 kΩ/□. The metal abundance formed in each of the films is measured using EPMA. The results of the measurements are as follows: the film formed with two droplets of palladium nickel compound contains $28.9\times10^{15}$ atoms/cm$^2$; that with three droplets $42.4\times10^{15}$ atoms/cm$^2$; and that with four droplets $58.2\times10^{15}$ atoms/cm$^2$.

From the conductance curve, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The result for the material at Ni-to-Pd mole ratio of 80:20 is 23.6%.

Fourth Embodiment

A 100 g aqueous solution is prepared by dissolving, in water, palladium-proline complex (0.275 g), nickel acetate hydrate (0.477 g), 88% saponified polyvinyl alcohol (500 average degree of polymerization) (0.1 g), ethylene glycol (2 g %), and 2-propanol (15 g). The water in which these substances are dissolved is passed through a membrane filter with a pore size of 0.25 μm, and a solution of palladium nickel compound (with mole ratio Pd metal to Ni metal 30:70) is thus obtained. Different substrates are prepared in the same manner as in the first embodiment, except that the solution of palladium nickel compound (prepared as above) is applied by the inkjet device, changing the number of times that this solution is applied between the device electrodes 3a and 3b. Each of the substrates is baked at 350° C., then further baked at 300° C. in a vacuum chamber for ten hours and the resistance of each of the films formed is measured. The results of the measurements are as follows: the film formed with two droplets of the solution of palladium nickel compound has 23.8 kΩ/□. that with three droplets 4.92 kΩ/□. and that with four droplets 2.9 kΩ/□. The metal abundance formed in each of the films is measured using EPMA. The results of the measurements are as follows: the film formed with two droplets of the solution of palladium nickel compound contains $22.8 \times 10^{15}$ atoms/cm$^2$; that with three droplets $41.3 \times 10^{15}$ atoms/cm$^2$; that with four droplets $58.0 \times 10^{15}$ atoms/cm$^2$.

From the conductance curve, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The result for the material at Ni-to-Pd mole ratio of 70:30 is 68.7%.

First Comparative Example

A 100 g aqueous solution is prepared by dissolving, in water, palladium-proline complex (0.344 g), nickel acetate hydrate (0.384 g), 88% saponified polyvinyl alcohol (500 average degree of polymerization) (0.1 g) ethylene glycol (2 g %), and 2-propanol (15 g). The water in which these substances are dissolved is passed through a membrane filter with a pore size of 0.25 μm, and a solution of palladium nickel compound (with mole ratio Pd metal to Ni metal 40:60) is thus obtained. Different substrates are prepared in the same manner as in the first embodiment, except that the solution of palladium nickel compound (prepared as above) is applied by the inkjet device, by changing the number of times that this solution is applied between the device electrodes 3a and 3b. Each of the substrates is baked at 350° C., then further baked at 300° C. in a vacuum chamber for ten hours and the resistance of each of the films formed is measured. The results of the measurements are as follows: the film formed with three droplets of the solution of palladium nickel compound has 3.3 kΩ/□. and that with four droplets 1.1 kΩ/□. The metal abundance formed in each of the films is measured using EPMA. The results of the measurements are as follows: the film formed with three droplets of the solution of palladium nickel compound contains $35.2 \times 10^{15}$ atoms/cm$^2$; and that with four droplets $47.1 \times 10^{15}$ atoms/cm$^2$.

From the conductance curve, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The result for the material at Ni-to-Pd mole ratio of 60:40 is infinite because the resistance infinitely diverges.

Second Comparative Example

A 100 g aqueous solution is prepared by dissolving, in water, palladium-proline complex (0.509 g), nickel acetate hydrate (0.162 g), 88% saponified polyvinyl alcohol (500 average degree of polymerization) (0.1 g), ethylene glycol (2 g %), and 2-propanol (15 g). The water in which these substances are dissolved is passed through a membrane filter with a pore size of 0.25 μm, and a solution of palladium nickel compound (with mole ratio Pd metal to Ni metal 70:30) is thus obtained. Different substrates are prepared in the same manner as in the first embodiment, except that the solution of palladium nickel compound (prepared as above) applied by the inkjet device, by changing the number of times that this solution is applied between the device electrodes 3a and 3b. Each of the substrates is baked at 350° C., then further baked at 300° C. in a vacuum chamber for ten hours and the resistance of each of the films formed is measured. The results of the measurements are as follows: the film formed with three droplets of the solution of palladium nickel compound has 2.6 kΩ/□. and that with four droplets 0.88 kΩ/□. The metal abundance formed in each of the films is measured using EPMA. The results of the measurements are as follows: the film formed with three droplets of the solution of palladium nickel compound contains $29.0 \times 10^{15}$ atoms/cm$^2$; and that with four droplets $41.0 \times 10^{15}$ atoms/cm$^2$.

From the conductance curve, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The result for the material at Ni-to-Pd mole ratio of 30:70 is infinite because the resistance infinitely diverges.

Third Comparative Example

A 100 g aqueous solution is prepared by dissolving, in water, palladium-proline complex (0.63 g), 88% saponified polyvinyl alcohol (500 average degree of polymerization) (0.1 g), ethylene glycol (2 g %), and 2-propanol (15 g). The water in which these substances are dissolved is passed through a membrane filter with a pore size of 0.25 μm, and a solution of palladium nickel compound (a solution of 100% Pd metal) is thus obtained. Different substrates are prepared in the same manner as in the first embodiment, except that the solution of palladium nickel compound (prepared as above) is applied by the inkjet device, changing the number of times that this solution is applied between the device electrodes 3a and 3b. Each of the substrates is baked at 350° C., then further baked at 300° C. in a vacuum chamber for ten hours and the resistance of each of the films formed is measured. The results of the measurements are as follows: the film formed with two droplets of the solution of palladium nickel compound has 1.0 kΩ/□. that with three droplets 0.44 kΩ/□. and that with four droplets 0.3 kΩ/□. The metal abundance formed in each of the films is measured using EPMA. The results of the measurements are as follows: the film formed with three droplets of the solution of palladium nickel compound has $20.8 \times 10^{15}$ atoms/cm$^2$; and that with four droplets $28.3 \times 10^{15}$ atoms/cm$^2$.

From the conductance curve, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The results are shown in the table below.

TABLE 1

| | | Comparative Example 3 | Comparative Example 2 | Comparative Example 1 | Embodiment 4 | Embodiment 3 | Embodiment 1 | Embodiment 2 | Comparative Example 4 |
|---|---|---|---|---|---|---|---|---|---|
| Mole Ratio (Pd/Ni) | | 100/0 | 70/30 | 40/60 | 30/70 | 20/80 | 10/90 | 5/95 | 0/100 |
| Abundance ($\times 10^{15}$ atms/cm$^2$) | Upper Limit | 9 | 26 | 29 | 25 | 46 | 50 | 48 | 76 |
| | Lower Limit | 7 | 21 | 23 | 21 | 37 | 41 | 43 | 62 |
| ΔR/24000 | | Divergent *1 | Divergent *1 | Divergent *1 | 69% | 24% | 23% | 12% | Divergent *1 |
| Volumn Resistivity (Ωm) | Upper Limit | $2.71 \times 10^{-5}$ | $5.41 \times 10^{-5}$ | $7.68 \times 10^{-5}$ | $1.54 \times 10^{-4}$ | $3.04 \times 10^{-4}$ | $2.82 \times 10^{-4}$ | $3.05 \times 10^{-4}$ | $7.33 \times 10^{-5}$ |
| | Lower Limit | Indefinite *2 | Indefinite *2 | Indefinite *2 | $3.68 \times 10^{-4}$ | $4.20 \times 10^{-4}$ | $3.63 \times 10^{-4}$ | $3.60 \times 10^{-4}$ | Indefinite *2 |
| Bulk Resistivity (Ωm) | | $1.06 \times 10^{-7}$ | $2.27 \times 10^{-7}$ | $1.73 \times 10^{-7}$ | $1.52 \times 10^{-4}$ | $1.28 \times 10^{-7}$ | $9.85 \times 10^{-8}$ | $1.37 \times 10^{-7}$ | $6.84 \times 10^{-8}$ |
| Bulk Resistivity Ratio | Upper Limit | 257 | 238 | 443 | 1011 | 2367 | 2859 | 2223 | 1071 |
| | Lower Limit | Divergent *1 | Divergent *1 | Divergent *1 | 2532 | 3273 | 3682 | 2621 | Divergent *1 |
| Density (g/cm$^3$) | Upper Limit | 3.5 | 3.8 | 3.3 | 3.0 | 3.0 | 3.1 | 2.6 | 2.4 |
| | Lower Limit | 3.3 | 3.6 | 3.1 | 2.9 | 2.8 | 3.1 | 2.5 | 2.2 |
| Bulk Density (g/cm$^3$) | | 12.0 | 11.1 | 10.2 | 9.8 | 9.5 | 9.2 | 9.1 | 8.9 |
| Bulk Density Ratio | Upper Limit | 0.29 | 0.34 | 0.32 | 0.31 | 0.31 | 0.34 | 0.29 | 0.27 |
| | Lower Limit | 0.28 | 0.32 | 0.30 | 0.29 | 0.29 | 0.33 | 0.27 | 0.25 |

Terms "Divergent" and "Indefinite" marked with *1 and *2 respectively mean that the values could not be determined because the resistance was too high to measure.

dance fluctuates by +10 or −10% is divided by the sheet resistance of 24 kΩ/□. (ΔR/24000). The result for the material of 100% Pd is infinite because the resistance infinitely diverges.

Fourth Comparative Example

A 100 g aqueous solution is prepared by dissolving, in water, nickel acetate hydrate (3.392 g), 88% saponified polyvinyl alcohol (500 average degree of polymerization) (0.1 g), ethylene glycol (2 g %), and 2-propanol (15 g). The water in which these substances are dissolved is passed through a membrane filter with a pore size of 0.25 μm, and a solution of palladium nickel compound (a solution of 100% Ni metal) is thus obtained. Different substrates are prepared in the same manner as in the first embodiment, except that the solution of palladium nickel compound (prepared as above) is applied by the inkjet device, changing the number of times that this solution is applied between the device electrodes 3a and 3b. Each of the substrates is baked at 350° C., then further baked at 300° C. in a vacuum chamber for ten hours and the resistance of each of the films formed is measured. The results of the measurements are as follows: the film formed with one droplet of the solution of palladium nickel compound has 10.5 kΩ/□. and that with two droplets 0.45 kΩ/□. The metal abundance formed in each of the films is measured using EPMA. The results of the measurements are as follows: the film formed with one droplet of the solution of palladium nickel compound contains 67.2×10$^{15}$ atoms/cm$^2$; and that with two droplets 137.5×10$^{15}$ atoms/cm$^2$.

From the conductance curve, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The result for the material of 100% Ni is infinite because the resistance infinitely diverges.

The metal abundance corresponding to a sheet resistance of 24 kΩ/□. is derived from each of the first to fourth embodiments and each of the first to the fourth comparative examples. Then, the degree of fluctuation (ΔR) of the sheet resistance when the quantity of metal fluctuates by +10 or −10% is divided by the sheet resistance of 24 kΩ/□. (ΔR/24000). The results are shown in the table below.

Where the quantity of Ni in an Ni—Pd alloy is equal to or greater than 70% but less than 100%, the degree of fluctuation (ΔR) of the sheet resistance when the metal abundance in the 24 KΩ/□. high resistance film fluctuating by +10 or −10% is divided by the sheet resistance of 24 kΩ/□. (ΔR/24000) is 12% to 69%. However, if the quantity of Ni in the Ni—Pd alloy falls outside of this range, the resistance diverges to infinity.

Accordingly, even if the metal abundance in the Ni—Pd alloy varies by +10% or −10%, the adjustment of Ni—Pd ratio restricts the variation of the resistance value (sheet resistance) to as low as 12%. This makes it possible to produce a panel with a plurality of electron emitting devices. In the case where the Ni/Pd ratio falls outside the range from 70% or greater to 100%, the resistance is infinitely divergent and hence variation in resistance is large, which makes panel formation impossible.

The volume resistivity is determined by multiplying the sheet resistance measured by the tester measurement and the film thickness value measured by a scanning type probe microscope. Specifically, the volume resistivity ρ(Ωcm) is found by applying the sheet resistance R (Ω/□. and the film thickness d(cm) in equation ρ=R·d.

The bulk resistivity ratio is calculated by (volume resistivity of film)/(bulk resistivity). In this case, the bulk resistivity refers to volume resistivity in a bulk state, obtained from a documented value.

The film thickness is measured using a scanning type probe microscope "SPM-9500J3" (tradename, manufactured by Shimazu Corporation).

To find the abundance of atoms in each film, the amount is measured from the same sample and a conversion curve chart is prepared in advance so that the characteristic X-rays counted by an electron beam micro-analyzer can be converted into the number of atoms per unit area. Thereafter, the number of atoms per unit area can thus be found simply by counting the characteristic X-rays by means of the electron beam micro-analyzer. Used for counting these are a total reflecting X ray fluorescent analyzer "TREX 630T" (tradename, manufactured by Technos International Inc.) and an electron beam micro-analyzer "EPMA-1600" (tradename, manufactured by Shimazu Corporation).

The film density is calculated from the abundance of atoms present per unit area obtained by the electron beam microanalyzer and total reflecting X-ray fluorescent analyzer and from the film thickness obtained by the scanning type probe microscope. Specifically, the film density D(g/cm³) can be calculated by applying in the formula below the abundance Ai (atoms/cm²) of element i per unit area of film thickness d(cm).

$$D = \frac{1}{d \cdot NA} \sum_i Mi \cdot Ai \quad \text{[Formula 1]}$$

In the formula, Mi represents the atomic weight of the element i; NA represents Avogadro constant; and Σ represents the summation over all the metal elements in the film.

The bulk density ratio is calculated from (density)/(bulk density).

The bulk density is the documented value of density in a bulk state. However, if a documented value of an alloy is not available, the bulk density of the alloy is calculated from available density values of each simple substance in a bulk state using the formula below.

$$\text{(Bulk density)} = \frac{\sum_i Ai \cdot Gi}{\sum_i Ai} \quad \text{[Formula 2]}$$

Here, Gi (g/cm³) represents the documented value of the bulk density of a simple substance of element i; and Σ represents the summation over all the metal elements in the film.

The film formed in the first embodiment is subjected to sectional TEM (Transmission Electron Microscopy) analysis and planar TEM analysis, and the film structure is analyzed. It has been found that in the film in the first embodiment, metal fine particles of nickel-palladium alloy of several nm to ten and several nm are connected in close contact with one another along the film thickness whereas the metal fine particles are less continuous along the plane. That is, the direction of the continuance of the particles along the film thickness is different from that along the plane.

The film formed in the third comparative example is subjected to sectional TEM analysis and planar TEM analysis in the manner described above. As a result, masses of fine metal particles of several nm to ten and several nm are observed and the direction of the continuance of the particles along the film thickness and that along the plane are the same.

Fifth Embodiment

A 100 g aqueous solution is prepared by dissolving, in water, platinum acetic acid-tetraethanolamine complex (0.097 g), nickel acetate hydrate (0.704 g), 88% saponified polyvinyl alcohol (500 average degree of polymerization) (0.1 g), ethylene glycol (2 g %), and 2-propanol (15 g). The water in which these substances are dissolved is passed through a membrane filter with a pore size of 0.25 μm, and a solution of platinum nickel compound (with mole ratio of Pt metal to Ni metal 5:95) is thus obtained. Different substrates are prepared in the same manner as in the first embodiment, except that the solution platinum nickel compound (prepared as above) is applied by the inkjet device, changing the number of times that this solution is applied between the device electrodes 3a and 3b. Each of the substrates is baked at 350° C., then further baked at 300° C. in a vacuum chamber for ten hours and the resistance of each of the films formed is measured. The results of the measurements are as follows: the film formed with two droplets of the solution of platinum nickel compound has 170.0 kΩ/□. that with three droplets 18.5 kΩ/□ and that with four droplets 9.5 kΩ/□. The metal abundance formed in each of the films is measured using EPMA. The results of the measurements are as follows: the film formed with two droplets of this solution is applied contains $26.6 \times 10^{15}$ atoms/cm²; that with three droplets $38.5 \times 10^{15}$ atoms/cm²; and that with four droplets $52.2 \times 10^{15}$ atoms/cm².

From the conductance curve, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The result for the material at Ni-to-Pd mole ratio of 95:5 is 47.5%.

Sixth and Seventh Embodiments

A solution of palladium cobalt compound and a solution of platinum cobalt compound are prepared. Different substrates are prepared in the same manner as in the first embodiment by changing the number of times that this solution is applied between the device electrodes 3a and 3b. Each of the substrates is baked at 350° C., the resistance of each of the films formed is measured, and the metal abundance is also measured using EPMA. From each of the conductance curves, the metal abundance corresponding to a sheet resistance of 24 kΩ/□. is derived in the same manner as in the first embodiment. Then, the degree of fluctuation (ΔR) of the sheet resistance when the metal abundance fluctuates by +10 or −10% is divided by the sheet resistance of 24 kΩ/□. (ΔR/24000). The result for the material at a Co-to-Pd mole ratio of 90:10 is 21.1%, and the result for the material at a Co-to-Pt mole ratio of 90:10 is 25.4%.

Eighth Embodiment

After a film of a mixture of nickel oxide and palladium oxide are formed in the same manner as in the first embodiment, the inside of the chamber is heated in the steps described below.

After a sample is first placed in the vacuum chamber, the inside of the vacuum chamber is emptied by a turbo molecular pump and a scroll pump until the pressure in the chamber reaches $1 \times 10^{-6}$ Pa or below. Subsequently, while the atmosphere in the chamber is monitored using a quadrupole mass spectrometer (QMS) and a variable leak valve is adjusted, methane gas is introduced into the chamber to a partial pressure of $1 \times 10^{-4}$ Pa. In this condition, the temperature of the stage is increased and each sample is heated from room temperature to 300° C. over three hours. Then, the temperature is maintained at 300° C. for ten hours. While pressure changes during heating are also monitored by QMS, the partial pressure of the methane gas is kept constant. Thereafter, the temperature is decreased to finish heating.

The film heated in the chamber is analyzed using X-ray photo electron spectroscopy (XPS). It has been found that both the nickel oxide and palladium oxide have deoxidized and changed into the form of a metal. In addition, a film of a mixture of nickel, palladium, and carbon has been formed, 50% of which in mole ratio is occupied by carbon formed as a result of decomposition of the methane on account of the catalytic effect of the nickel.

The film thus formed on the entire surface of a 30-mm square glass substrate is analyzed using an X-ray diffractometer (XRD). As a result, it has been found from a diffraction peak that the nickel and palladium have been alloyed.

The condition of the carbon in this film is analyzed using a microscope laser Raman spectrometer. As a result, a peak of 1580 (cm$^{-1}$) resulting from graphitization of carbon has been detected. It has been confirmed that the carbon has been graphitized on account of the catalytic effect of nickel.

The film of a mixture of graphite carbon and nickel-palladium alloy is evaluated in the manner described above. It is found that variation in resistance is small with respect to changes in quantity.

Ninth Embodiment

An electron emitting device is formed from the film described in the first embodiment.

Using a sputtering method and a lift-off method, device electrodes of a thickness of 40 nm are formed from Pt on the glass substrate. Subsequently, the surface of the substrate is screen printed with a paste material ("NP-4035C" tradename, manufactured by Noritake Co. Limited). The substrate is baked at 450° C., thereby forming printed wirings (column wirings) of 10 μm thickness thereon. The printed wirings are connected to the device electrodes so that electricity passes between them. Next, the surface of the substrate is screen printed with another paste material ("NP-7710" tradename, manufactured by Noritake Co. Limited). The substrate is baked at 570° C., thereby forming an insulating film of 20 μm thickness thereon. Then, the surface of the substrate is screen printed with yet another paste material ("NP-4035C" tradename, manufactured by Noritake Co. Limited). The substrate is baked at 450° C., thereby forming printed wirings (row wirings) of 10 μm thickness thereon. The printed wirings are connected to the device electrodes so that electricity passes between them. The upper and lower printed wirings are insulated by the insulating film.

The substrate with the device electrodes and printed wirings thus formed is washed and then surface treated. The surface treatment process is performed in order to make the droplet shape stable and uniform in the process of forming a conductive film by the inkjet system (described below). Specifically, the substrate is left to stand at room temperature (approximately 25° C.) for 30 minutes in a container filled with saturated dimethyldimethoxysilane vapor.

Using the jetting device of an inkjet system, several droplets of a solution of palladium nickel compound are applied between the device electrodes on the surface-treated substrate in the same manner as in the first embodiment. The droplets applied at this time spread in a 60 μm-diameter circle over an area on the surface of the substrate, including the edges of the device electrodes.

After droplet application, the substrate is heated for 30 minutes in an oven in which atmospheric air has been heated to 350° C. Thus, a conductive film is formed from a mixture of nickel oxide and palladium oxide in the area whereby the device electrodes communicate.

The substrate thus formed is held in the vacuum chamber. The printing wirings are connected to probe groups outside the chamber so as to allow power supply and resistance measurement from the outside of the chamber. The inside of the chamber is emptied by the turbo molecular pump and scroll pump until the pressure in the chamber reaches 1×10$^{-6}$ Pa or below. Subsequently, the substrate is heated from room temperature to 300° C. over three hours. The substrate is kept at 300° C. for ten hours. Thereafter, the temperature is decreased and heating is finished. Through the heating process in the vacuum, the nickel oxide and palladium oxide are deoxidized and a conductive film is formed from an alloy of nickel and palladium.

Subsequently, a gap is formed in the conductive film by power supply foaming (described below) while the inside of the chamber is kept at a vacuum.

A voltage output from a voltage application means is applied to the substrate by switching scanning circuits one after another, thereby scanning all lines. A voltage applied to each of the lines is a triangular wave, as shown in FIG. 2B, that has a pulse in which T1=0.1 ms and T2=50 ms. The voltage is applied at 1 V initially, increasing by 0.1 V every five seconds, and terminates after 20 V has been applied. When about 13 to 15V are applied in the process of increasing the voltage, a gap is formed in the conductive film due to Joule heat resulting from the supply of electrical current. By the time the application of voltage is terminated, the resistances of all the lines on the conductive film have increased to 1 MΩm or greater. Thus, an electron emitting part is formed in the conductive film.

Subsequently, tolunitrile vapor is introduced into the chamber at a partial pressure of 1.3×10$^{-4}$ Pa, and the activation process is performed for 30 minutes under the application of pulse voltage between the X-direction and Y-direction terminals. A rectangular pulse of 18 V, 1 ms and a rectangular pulse of −18 V, 1 ms are alternately applied at 100 Hz. This process is performed in order to deposit carbon near the gap in the conductive film formed on the substrate and increase the emission of electrons. Observing the increase of device current in the device current during the activation, it has been found that the increase is uniform over the entire conductive film.

Thus, an electron source is formed in which each of the electron emitting devices has uniform electron emission efficiency on the substrate.

Using this electron source, an image display apparatus as shown in FIG. 5 is constructed.

A rear plate 21 made of glass, on which the electron sources have been formed, a support frame 86, and a face plate 82 are joined together. Using frit glass, they are joined at 450° C. Formed on the inside of the face plate 82 are a metal back 85 and fluorescent film 84. A high voltage terminal Hv connected to the metal back 85 extends to the external part of the image display apparatus. The printed wirings formed on the rear plate 21 are the X-direction wirings 26 and Y-direction wirings 24 extending to the external part of the image display apparatus. An exhaust pipe (not shown) is inserted in the image display apparatus, and air in this apparatus is emptied using a vacuum pump. The exhaust pipe is welded by a gas burner and thus the image display apparatus is completed. 4 kV potential is applied to the metal back 85 of the image display apparatus through the high voltage terminal Hv, and images are displayed by inputting image signals to the X-direction and Y-direction wirings 26 and 24.

As a result, it is observed that a uniform display is obtained over the entire surface of the display screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-198839, filed Jul. 31, 2007 which is hereby incorporated by reference herein in its entirety.

What is claimed is:

1. A conductive film of thickness of from 3 nm to 50 nm including an alloy formed on a substrate,
    wherein the alloy is formed from at least one element selected from transition metal group A consisting of Ni and Co and at least one element selected from precious metal group B consisting of Pd, Pt, Ir, and Rh respectively and an element ratio of the group A materials to the group B materials in the alloy is 2 or more,
    wherein a ratio of density of the conductive film to bulk density of the alloy is from 0.2 to 0.5 and a ratio of resistivity thereof to bulk resistivity of the alloy is from 100 to 100000,
    wherein the conductive film further contains 30% or more graphite carbon in element ratio as a mixture.

2. An electron emitting device that has a conductive film according to claim 1.

3. An image display apparatus that has the electron emitting device according to claim 2.

* * * * *